US011625973B2

(12) United States Patent
Froy, Jr. et al.

(10) Patent No.: US 11,625,973 B2
(45) Date of Patent: Apr. 11, 2023

(54) MULTI-USER GAZE DETECTION AT ELECTRONIC GAMING DEVICES

(71) Applicant: IGT, Las Vegas, NV (US)

(72) Inventors: David Froy, Jr., Lakeville-Westmorland (CA); Stefan Keilwert, St. Josef (AT); Michael Russ, Graz Styria (AT)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 17/232,872

(22) Filed: Apr. 16, 2021

(65) Prior Publication Data

US 2021/0335085 A1 Oct. 28, 2021

Related U.S. Application Data

(60) Provisional application No. 63/013,882, filed on Apr. 22, 2020.

(51) Int. Cl.
*G07F 17/32* (2006.01)
*G06F 7/70* (2006.01)
*G06T 7/70* (2017.01)

(52) U.S. Cl.
CPC ........... *G07F 17/3206* (2013.01); *G06T 7/70* (2017.01); *G06T 2207/30201* (2013.01)

(58) Field of Classification Search
CPC ...... A63F 2300/1025; A63F 2300/1087; A63F 2300/6045; A63F 2300/8082; A63F 13/40; A63F 13/42; A63F 13/426; A63F 13/428; A63F 13/45; A63F 13/53; A63F 13/533; A63F 13/60; A63F 13/65; A63F 13/86; G07F 17/3204; G07F 17/3206; G07F 17/3209; G07F 17/3211; G07F 17/3216; G07F 17/3218; G07F 17/326; G07F 17/3286; G06T 19/006; G06F 3/013; G06F 3/015
See application file for complete search history.

(56) References Cited

U.S. PATENT DOCUMENTS

| | | | | |
|---|---|---|---|---|
| 5,779,549 A | * | 7/1998 | Walker | A63F 13/12 463/25 |
| 6,417,861 B1 | * | 7/2002 | Deering | G06T 15/005 345/589 |
| 6,424,343 B1 | * | 7/2002 | Deering | G06T 15/503 345/419 |
| 6,664,955 B1 | * | 12/2003 | Deering | G06T 3/4007 345/428 |

(Continued)

FOREIGN PATENT DOCUMENTS

AU 2016273828 A1 * 6/2017

*Primary Examiner* — Steven J Hylinski
(74) *Attorney, Agent, or Firm* — Sage Patent Group

(57) ABSTRACT

Gaming devices, systems, and methods are provided. The gaming device includes a display device, an image capture device to capture images of eyes of multiple users of the device, and a processor circuit. A memory includes machine-readable instructions that, when executed by the processor circuit, cause the processor circuit to generate, for each of the images of eyes of the plurality of users, gaze direction data corresponding to gaze directions of the eyes of each of the plurality of users and, based on the gaze direction data of the plurality of users, modify a gaming device function.

15 Claims, 11 Drawing Sheets

(56) References Cited

U.S. PATENT DOCUMENTS

| | | | |
|---|---|---|---|
| 6,956,576 B1* | 10/2005 | Deering | G06T 15/00 345/475 |
| 8,758,126 B2 | 6/2014 | Bavitz et al. | |
| 9,286,711 B2* | 3/2016 | Geisner | G06F 3/013 |
| 10,373,383 B1* | 8/2019 | Werner | G06Q 20/322 |
| 10,379,612 B1* | 8/2019 | Bonnier | G06F 3/0304 |
| 11,308,758 B2* | 4/2022 | Schwartz | G07F 17/3239 |
| 2002/0183115 A1* | 12/2002 | Takahashi | A63F 13/48 463/42 |
| 2003/0011618 A1* | 1/2003 | Deering | G06F 5/20 345/613 |
| 2008/0161111 A1* | 7/2008 | Schuman | A63F 13/71 463/41 |
| 2012/0146891 A1* | 6/2012 | Kalinli | H04N 19/172 345/156 |
| 2013/0083062 A1* | 4/2013 | Geisner | G02B 27/017 345/633 |
| 2013/0307771 A1* | 11/2013 | Parker | G06F 3/167 345/158 |
| 2014/0002444 A1* | 1/2014 | Bennett | G06T 19/006 345/419 |
| 2014/0038708 A1* | 2/2014 | Davison | A63F 13/5252 463/31 |
| 2016/0109947 A1* | 4/2016 | George-Svahn | G06F 3/04883 345/156 |
| 2016/0202756 A1* | 7/2016 | Wu | G06F 3/0304 382/103 |
| 2017/0011554 A1* | 1/2017 | Burba | G06T 15/20 |
| 2017/0090566 A1* | 3/2017 | George-Svahn | G06F 3/04883 |
| 2017/0266554 A1* | 9/2017 | Marks | A63F 13/352 |
| 2017/0269685 A1* | 9/2017 | Marks | A63F 13/533 |
| 2017/0269713 A1* | 9/2017 | Marks | G06F 3/0346 |
| 2017/0354875 A1* | 12/2017 | Marks | A63F 13/213 |
| 2018/0164882 A1* | 6/2018 | Johnson | G02F 1/0063 |
| 2018/0288477 A1* | 10/2018 | Gupta | H04N 21/4532 |
| 2018/0311585 A1* | 11/2018 | Osman | A63F 13/5255 |
| 2019/0079302 A1* | 3/2019 | Ninan | G06F 1/1656 |
| 2019/0099660 A1* | 4/2019 | Nelson | A63F 3/00157 |
| 2019/0228679 A1* | 7/2019 | Dowell | A63F 13/2145 |
| 2019/0240569 A1* | 8/2019 | Kuwatani | A63F 13/25 |
| 2019/0324528 A1* | 10/2019 | Williams | G02B 27/0093 |
| 2019/0339770 A1* | 11/2019 | Kurlethimar | G06F 3/0346 |
| 2020/0092537 A1* | 3/2020 | Sutter | G06F 3/013 |
| 2020/0289934 A1* | 9/2020 | Azmandian | G06F 3/0346 |
| 2020/0326774 A1* | 10/2020 | Hong | G06T 11/60 |
| 2021/0064129 A1* | 3/2021 | Yasuda | G06F 3/0484 |

\* cited by examiner

300

```
┌─────────────────────────────────────────────────────────────────┐
│  Generate gaze direction data corresponding to gaze directions of the │
│                      eyes of multiple users                     │
│                              302                                │
└─────────────────────────────────────────────────────────────────┘
                                │
                                ▼
┌─────────────────────────────────────────────────────────────────┐
│  Modify a gaming device function based on the gaze direction data  │
│                              304                                │
└─────────────────────────────────────────────────────────────────┘
```

*FIG. 3*

MULTI-USER GAZE DETECTION AT ELECTRONIC GAMING DEVICES

CROSS REFERENCE TO RELATED APPLICATIONS

This application claims domestic priority to U.S. Provisional Patent Application No. 63/013,882, filed on Apr. 22, 2020, the disclosure and content of which is incorporated by reference herein in its entirety.

BACKGROUND

In casinos and other establishments, players may play wagering games using electronic gaming machines (EGMs), such as video gaming terminals, and other gaming devices. EGMs may include other types of systems, such as online gaming systems that enable users to play games using computer devices, such as desktop computers, laptops, tablet computers or smart phones, computer programs for use on a computer device, gaming consoles that are connectable to a display, such as a television or computer screen, and others.

EGMs may be configured to enable players to provide input via buttons, keyboards, touch interfaces, and other input devices. Such input may be used by the EGM to identify the player, to enable or disable game features, or to perform other functions of the EGM. To date, head, facial and gaze tracking of single players of EGMs have become increasingly popular in the gaming business.

BRIEF SUMMARY

Some embodiments herein are directed to gaming devices that include a display device, an image capture device to capture images of eyes of multiple users of the gaming device, a processor circuit, and a memory. The memory includes machine-readable instructions that, when executed by the processor circuit, cause the processor circuit to generate, for each of the images of eyes of the users, gaze direction data corresponding to gaze directions of the eyes of each of the users. Based on the gaze direction data of the users, a gaming device function is modified.

Some embodiments are directed to a method that includes operations of capturing, by an image capture device, multiple images of an eye of each of multiple players of a gaming device at multiple times. Operations may include generating, for each of the images, gaze direction data indicative of a gaze direction of the eye of the players at the respective times corresponding to the image. Based on the gaze direction data of the players, operations may include modifying a gaming device function.

Some embodiments are directed to systems disclosed herein. Such systems my include a processor circuit and a memory including machine-readable instructions that, when executed by the processor circuit, cause the processor circuit to perform operations of determining gaze direction data corresponding to multiple users at a gaming device, determining a biometric identifier corresponding to a first user of the multiple users and store the gaze direction data and the biometric identifier corresponding to the first user. Operations may further include modifying a gaming device function based on gaze direction data corresponding to the plurality of users.

BRIEF DESCRIPTION OF DRAWINGS

FIG. 3, which is a schematic block diagram that illustrates operations of a gaming device according to some embodiments herein.

DETAILED DESCRIPTION

Figure 1A:
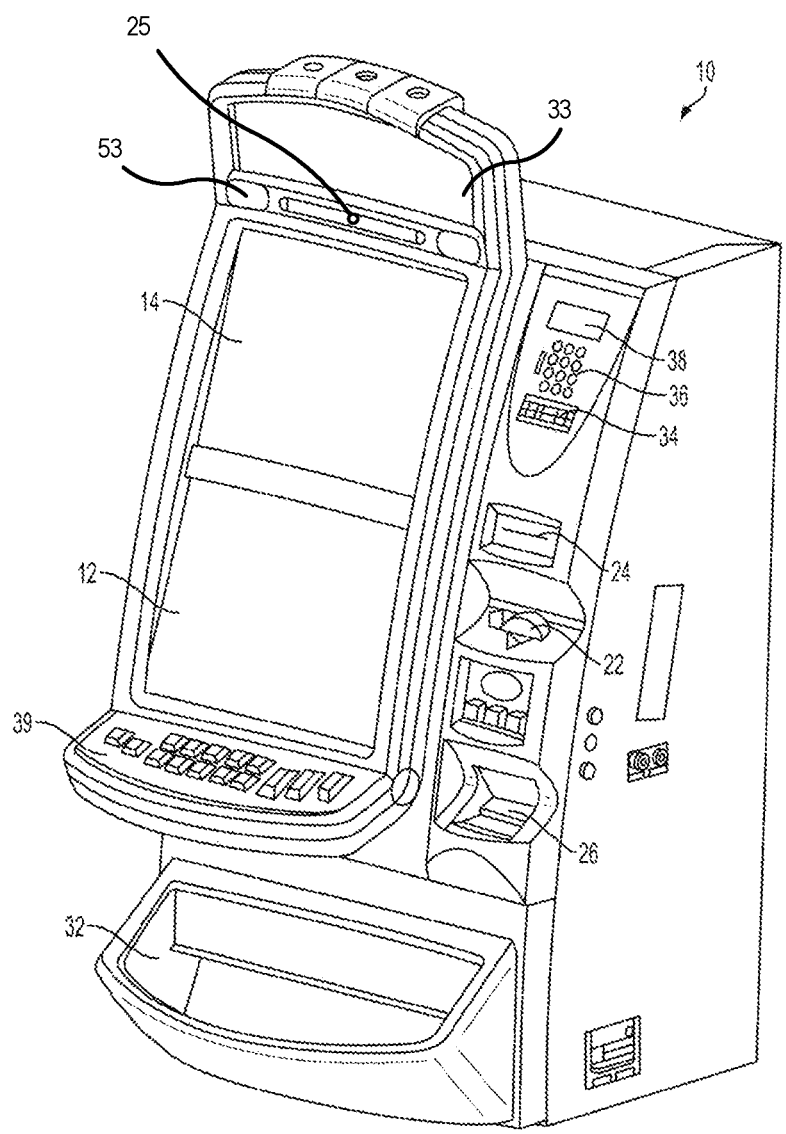
FIG. 1A is a perspective view of an electronic gaming machine according to some embodiments.

While single user gaze tracking has been used in the past, current embodiments include equipping EGMs and other gaming machines and stations, including, for example, multiplayer games, with a high-resolution camera monitoring framework to allow the tracking of multiple users' head, facial expressions and/or gaze. In some embodiments, multiple users might interact the gaming device at the same time, whereas separately tracking and processing each player's head/face/gaze interactions may provide unique player experiences.

In some embodiments, multiplayer gaze technology may include more than one user enabled game play and provide interactions for new possibilities. In some embodiments, multi-user gaze technology may be applied to premium products. In this manner, embodiments may enrich game-play interaction and/or immersion.

Some embodiments include a "pass-by multiplayer gaze game" that may be available on the casino floor for money generation and/or for promotional reasons. In some embodiments, players can join without significant effort, just by using their gaze.

In some embodiments, each user may be associated with an ID that may optionally be anonymous or include personal information such as a player name, and show results of each player ID based on their gaze ("ID 123, player XYZ is correct and receives 1000 points").

In some embodiments, the winner of a game session might receive a voucher for casino-internal offerings. Non-limiting examples of such offerings include hospitality offerings such as food or drink, credits for table games, and/or EGM credits, among others.

Some embodiments provide that the user ID for each player may be used to remember their eye tracking calibration. For example, when a new user is playing a game for the first time, they may be presented with count-up animations in different locations. When the animation is triggered, their eye position and/or image are recorded and the location of their gaze may be saved for building up a more accurate and/or improved accuracy gaze detection calibration. In some embodiments, a custom calibration feature that appears for a new user will prompt the new user to look at specific locations on screen and capture images of their eyes to be used for calibration of the system.

In some embodiments, camera technology may capture head tracking and facial recognition of the users as well as eye tracking for gaze detection. Some embodiments provide that head tracking can be used to determine if a player is paying attention to the EGM and is participating in the game. Some embodiments provide that while one player may sit at the EGM, observers may take part in the action based on the multi-user gaze detection.

In some embodiments, game streaming pages such as those type corresponding to Twitch may provide that the cameras identify how many observers are currently looking at the player while the player is playing the game. In some embodiments, the number of observers can be shown to the player, to the operator, and/or on a heat map to indicate "hot spots" among the casino floor.

In some embodiments, multiple machines can be linked to each other and track which machine is being viewed by the most players and be used for triggering special features during a bonus round. Each machine may be able to either process the video feed locally or send the video feed to a central server which will identify users and where they are looking.

Some embodiments provide that the central system will keep a database of user IDs and which EGM the player is in front of. This may also be used to allow players to register and/or unregister themselves, so they are not tracked. When a new player is tracked, they may be identified and asked if they want to register. When they register, they can opt in to track their account details and eye tracking calibration. If they opt out, they will be ignored by the system. Some embodiments provide that the basic anonymous account will be set up, so the system will know to ignore them.

In some embodiments, multiple people gaze-bonuses may be provided depending on where the individuals are looking. In some embodiments, gaze and multiple people may add interactions that may include multiple zones of gaze awareness, which may be used for tracking multiple users. Some embodiments provide that multiple people competing in a bonus game may compete with each other using multiple gaze (i.e., gaze player 1 vs gaze player 2).

Some embodiments provide detecting the number of players looking at the left side of the screen vs. the number of players looking at the right side of the screen. In some embodiments, the multi-user gaze detection may be used for a multiplayer trivia knowledge game. For example, players may be encouraged to gaze at the answer they think is correct. In some embodiments, all correct players may advance in the game while others may be removed from the game based on not providing correct answers and/or a threshold quantity of incorrect answers.

In some embodiments, multi-user gaze detection may be used in a position-dependent, multiplayer gaze skill game. For example, a game may proscribe that every player standing on the left side of the screen look up, every player on the right side of the screen look down. Players who fail, may be removed from the game.

In some embodiments, data from multi-user gaze detection may be used to create heatmaps to identify points of interest, such as a single product, a bank of machines, and/or an overhead display. The heatmaps may include single users and/or aggregated data. In some embodiments, heatmaps may include identified points of interest as input parameter to alter game content in real time, including graphics, animations, sounds, and/or lights, among others. Some embodiments provide that the number of eyes looking at specific spots at specific moments in time may be identified. In some embodiments, duration of eyes looking at specific spots as input parameter to alter game content in real time may be identified. Some embodiments provide that the number of individual persons may be counted by knowing how many eyes are watching. This number may be used to dynamically adjust game content such as multiple potential players looking at a product in idle-mode, and/or to trigger advanced presentations.

In an EGM, which is a type of gaming device according to some embodiments, the operation of the EGM, and in particular the operation of the EGM to operate and/or display at least one of the concurrently displayed games, may be controlled in response to eye gaze data corresponding to multiple users. In particular, in some embodiments, an aspect of one of the concurrently displayed games may be controlled based on whether the EGM determines that one or more players are looking, or are not looking, at one or more concurrently displayed games. The use of multiple user gaze detection data may be improved and/or augmented by using other secondary inputs in conjunction with the gaze detection data.

The EGM may include at least one data capture camera device that is configured to monitor the eye gaze of multiple users that may include players and/or non-players to collect player eye gaze data. Such monitoring may be performed continuously or selectively when eye gaze data is needed. The graphics processor of the EGM may be configured to generate a plurality of interactive game environments using the game data of a plurality of interactive games. The display device of the EGM may display a viewing area for each of the plurality of interactive games, which may form a portion of the interactive game environment for each game.

The EGM may be configured with algorithms to process recorded image data to detect in real-time the position of the different user's eyes in three-dimensional (3D) space and the focus of the users' gaze in two dimensional-space (2D) or 3D space. The position of the users' eyes may be the respective physical locations of the users' eyes in 3D space. The focus of the user's gaze may be the focus of the gaze on a display device of the EGM.

The EGM may have a game controller that can determine the locations of the eye gaze of the users relative to the viewing area by mapping the location of the user's eye gaze on the display device to the viewing area. The users' eye gaze data can be analyzed to determine what the users are looking at. The game controller may trigger a control command to the display controller of the EGM to dynamically update the rendering of the viewing area of one or more of the concurrently displayed games based on the users' eye gaze data. For example, in response to the control command, the display controller may control the display device in real-time or near real-time using the graphics processor to dynamically update the rendering of the viewing area to provide a real-time or near real-time graphical animation effect displayed on the display device to update the visible game components in the viewing area based on the users' eye gaze data.

The gaming enhancements described herein may be carried out using a physical EGM that may be embodied in a variety of forms, machines and devices including, for example, portable devices, such as tablets and smart phones, that can access a gaming site or a portal (which may access a plurality of gaming sites) via the Internet or other communication path (e.g., a LAN or WAN), and so on. The EGM may be located in various venues, such as a casino or an arcade.

Figure 1B:
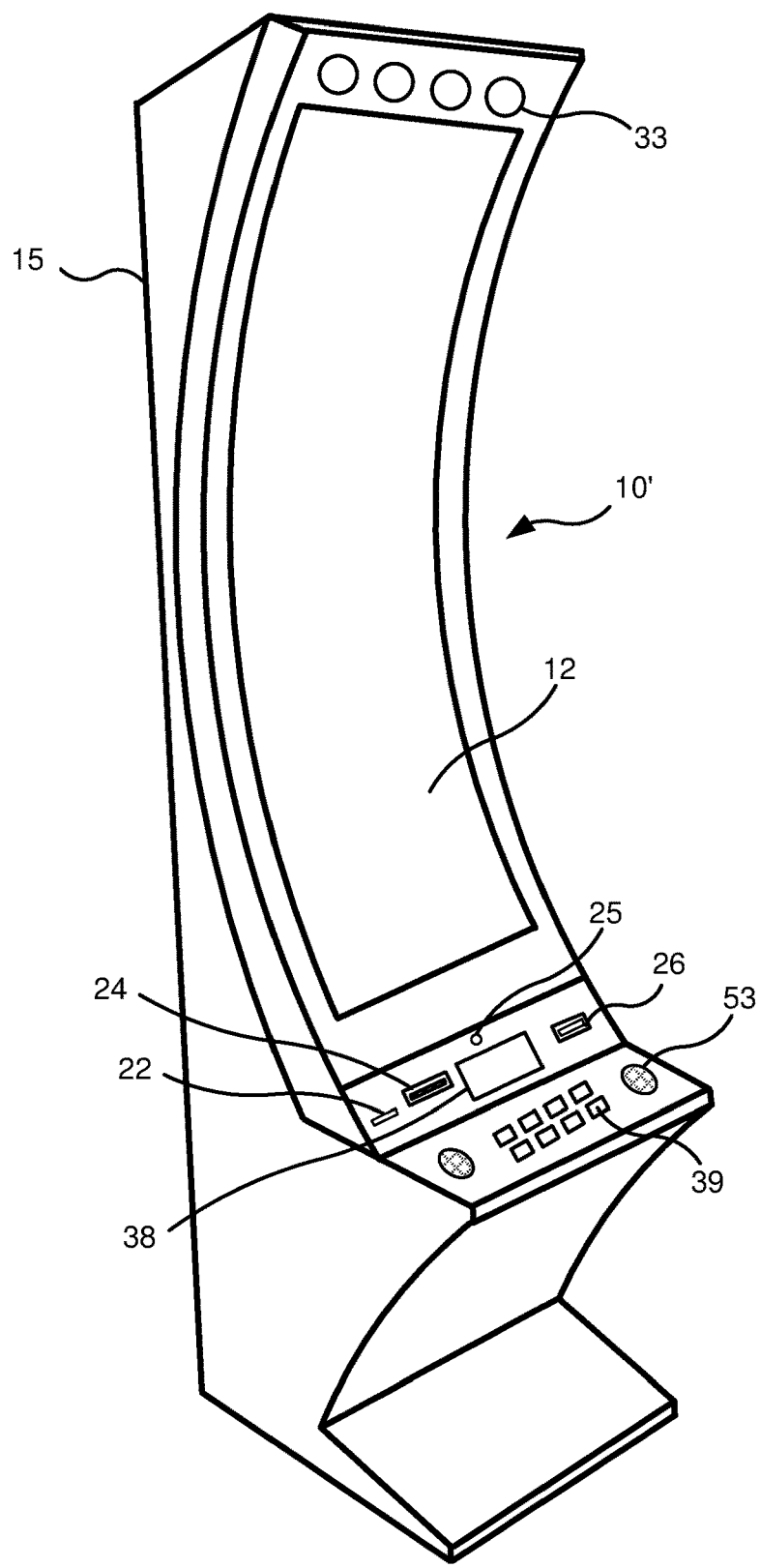
FIG. 1B is a perspective view of an electronic gaming machine according to further embodiments.

FIG. 1A is a perspective view of an EGM 10, and FIG. 1B is a perspective view of an EGM 10', that are configured to monitor eye gaze of a player to collect player eye gaze data, and to control operation of one of a displayed game in response to the player eye gaze data in accordance with some embodiments. A game controller may determine a location of the eye gaze of the player relative to a viewing area of the interactive game environment using the player eye gaze data and triggering a control command to control operation of the displayed game. In particular, a display controller in the EGM may dynamically update the rendering of the viewing area or a portion of the viewing area based on the player eye gaze data.

The EGM 10 has at least one data storage device to store game data for a plurality of interactive games. The data storage device may store game data for one or more primary interactive games and one or more bonus interactive games. The display controller may detect a control command from a game controller of the EGM and responsive to such command may dynamically update the rendering of the viewing area.

The example EGM 10 illustrated in FIG. 1A includes a display device 12 that may include a thin film transistor (TFT) display, a liquid crystal display (LCD), a cathode ray tube (CRT), auto stereoscopic 3D display and LED display, an OLED display, or any other type of display. An optional second display device 14 provides game data or other information in addition to display device 12. The display devices 12, 14, may have 2D display capabilities or 3D display capabilities, or both. The second display device 14 may provide static information, such as an advertisement for the game, the rules of the game, pay tables, pay lines, or other information, or may even display the main game or a bonus game along with display device 12. Alternatively, the area for display device 14 may be a display glass for conveying information about the game. Display device 12, 14 may also include a camera, sensor, and other hardware input devices. The display devices 12, 14 may display at least a portion of the visible game components of a plurality of interactive games. In particular, the display devices may simultaneously display a plurality of concurrently active interactive games.

The EGM 10 includes speakers 53 for playing audio associated with the games, which may include background music, sound effects, voiceovers, and other types of sounds. The sounds generated by the EGM 10 may be associated with one or more games playable on the EGM 10.

The EGM 10 further includes accent lights 33 that are separate from the display devices. Activation of the accent lights 33 may be coordinated with the game play of a game on the EGM 10. For example, when the player wins a prize, the accent lights may be activated and caused to flash different colors. The accent lights 33 may, for example, include RGB LEDs that can be programmed to flash or light up in different colors, patterns, brightnesses, etc. The accent lights 33 may be further synchronized with animations displayed on the display device 12, 14 and sounds played on the speakers 53.

In some embodiments, the display device 12, 14 may be a touch sensitive display device. The player may interact with the display device 12, 14 using touch control such as, but not limited to, touch, hold, swipe, and multi-touch controls. The player may use these interactions to manipulate the interactive game environment for easier viewing or preference, to manipulate game elements such as visible game components, or to select at least a portion of the visible game components depending on the design of the game. For example, the player may select one or more visible game components displayed by the display device 12, 14. As another example, the player may not have to touch the display device 12, 14 to play the interactive game. The player may instead interact with the interactive game using their eye gaze, eye gestures, and/or body movements.

The EGM 10 may include a data capture camera device 25 that is configured to continuously detect and monitor player interaction commands (e.g. eye gaze, eye gestures, player movement, touch, gestures) to interact with the viewing area and game components displayed on the display device 12, 14. Images from the data capture camera device 25 are transmitted to a game controller which determines a location of the eye gaze of the users relative to the viewing area using the data provided by the image capture device 25 or other data capture device. In some embodiments, a separate eye gaze tracking module including a data capture device and a processor may be provided. The processor of the eye gaze module may determine a location of the eye gaze of multiple users including one or more players and/or non-players relative to the viewing area using the data provided by the data capture device, and the eye gaze tracking module may provide player eye gaze data to the game controller.

Eye gaze data may be captured for multiple players and/or spectators, observers and/or other non-players of an EGM 10. Accordingly, the player eye gaze data may include eye gaze data of multiple players. It will be appreciated that any reference herein to a player in the singular may include multiple players.

The data capture camera device 25 may include a single detector configured to capture images of the player or players of the EGM 10 from a single direction or multiple detectors configured to capture images of the player or players from multiple directions. The EGM 10 may be configured to detect the presence and location of multiple players.

In some embodiments, the game controller may trigger a control command to the display controller to dynamically update the rendering of the viewing area based on the player eye gaze data. In response to the control command, the display controller may control the display device in real-time or near real-time using the graphics processor to dynamically update the rendering of the viewing area to provide a real-time or near real-time graphical animation effect displayed on the display device that may represent a visual update to the visible game components in the viewing area, the visual update based on the player eye gaze data. In some embodiments, the control command may be based on the eye gaze, eye gesture, or the movement of the player, or any combination thereof. The eye gaze of the player may be the location on the display device where the player is looking. The eye gesture of the player may be the gesture made by the player using one or more eyes, such as widening the eyes, narrowing the eyes, blinking, and opening one eye and closing the other. The movement of the player may be the movement of the player's body, which may include head movement, hand movement, chest movement, leg movement, foot movement, or any combination thereof. A winning outcome of the game for provision of an award may be triggered based on the eye gaze, eye gesture, or the movement of the player. For example, by looking at a game component displayed by the display controller on the display device 12, 14 for a pre-determined period of time, the player may trigger a winning outcome. The award may include credits, free games, mega pot, small pot, progressive pot, and so on.

The display device 12, 14 may have a touch screen lamination that includes a transparent grid of conductors. Touching the screen may change the capacitance between the conductors, and thereby the X-Y location of the touch may be determined. The X-Y location of the touch may be mapped to positions of interest to detect selection thereof, for example, the game components of the interactive game. A game processor of the EGM 10 associates this X-Y location with a function to be performed. Such touch screens may be used for slot machines, for example, or other types of gaming machines. There may be an upper and lower multi-touch screen in accordance with some embodiments. One or both of display device 12, 14 may be configured to have auto stereoscopic 3D functionality to provide 3D enhancements to the interactive game environment. The touch location positions may be 3D, for example, and mapped to at least one visible game component of the plurality of visible game components.

The EGM 10 may include a physical device for receiving and accepting value from a player, such as a coin, bill, token, printed ticket, magnetic card, or other token of value in return for which the player is granted credits on the EGM 10. For example, a coin acceptor 22 may have a coin slot that accepts coins or tokens in one or more denominations to generate credits within EGM 10 for playing games. A ticket acceptor 24 includes an input slot that receives machine readable printed tickets and outputs printed tickets for use in cashless gaming. A bill acceptor 26 receives and validates paper money deposited by the player.

A coin tray 32 may receive coins or tokens from a hopper upon a win or upon the player cashing out. However, the EGM 10 may be a gaming terminal that does not pay in cash but only issues a printed ticket for cashing in elsewhere. Alternatively, a stored value card may be loaded with credits based on a win, or may enable the assignment of credits to an account associated with a computer system, which may be a computer network connected computer.

In some embodiments, the EGM 10 may include a scanner for scanning a barcode indicative of a cryptocurrency address, such as a bitcoin, litecoin or ethereum address, to permit the EGM 10 to transfer credits to a player in the form of a cryptocurrency.

A card reader 34 may read from various types of cards, such as smart cards, magnetic strip cards, or other types of cards conveying machine readable information. The card reader reads the inserted card for player and credit information for cashless gaming. Card reader 34 may read a magnetic code on a conventional player tracking card, where the code uniquely identifies the player to a host system at the venue. The code is cross-referenced by the host system to any data related to the player, and such data may affect the games offered to the player by the gaming terminal. The card reader 34 may also include an optical reader and printer for reading and printing coded barcodes and other information on a paper ticket. A card may also include credentials that enable the host system to access one or more accounts associated with a user. The account may be debited based on wagers by a user and credited based on a win.

The card reader 34 may be implemented in different ways for various embodiments. The card reader 34 may be an electronic reading device such as a player tracking card reader, a ticket reader, a banknote detector, a coin detector, or any other input device that can read an instrument supplied by the player for conveying a monetary amount. In the case of a tracking card, the card reader 34 detects the player's stored bank and applies that to the gaming machine being played. The card reader 34 or reading device may be an optical reader, a magnetic reader, or other type of reader. The card reader 34 may have a slot provided in the gaming machine for receiving the instrument. The card reader 34 may also have a communication interface (or control or connect to a communication interface) to digitally transfer tokens or indicia of credits or money via various methods such as RFID, tap, smart card, credit card, loyalty card, NFC and so on.

An electronic device may couple (by way of a wired or wireless connection) to the EGM 10 to transfer electronic data signals for player credits and the like. For example, near field communication (NFC) may be used to couple to EGM 10 which may be configured with NFC enabled hardware. This is a non-limiting example of a communication technique.

A keypad 36 may accept player input, such as a personal identification number (PIN) or any other player information. A display 38 above keypad 36 displays a menu for instructions and other information and provides visual feedback of the keys pressed.

The keypad 36 may be an input device such as a touchscreen, or dynamic digital button panel, in accordance with some embodiments.

The EGM 10 may include a plurality of player control buttons 39 that include any buttons or other controllers needed to play the particular game or games offered by EGM 10 including, for example, a bet button, a repeat bet button, a spin reels (or play) button, a maximum bet button, a cash-out button, a display pay lines button, a display payout tables button, select icon buttons, and any other suitable button. The player control buttons 39 may in some embodiments be implemented as virtual buttons on a touch screen display.

The EGM 10 may also include the buttons 39 as part of a digital button panel. The digital button panel may include various elements such as for example, a touch display, animated buttons, frame lights, and so on. The digital button panel may have different states, such as for example, standard play containing bet steps, bonus with feature layouts, point of sale, and so on. The digital button panel may include a slider bar for adjusting the three-dimensional panel. The digital button panel may include buttons for adjusting sounds and effects. The digital button panel may include buttons for betting and selecting bonus games. The digital button panel may include a game status display. The digital button panel may include animation. The buttons of the digital button panel may include a number of different states, such as pressable but not activated, pressed and active, inactive (not pressable), certain response or information animation, and so on. The digital button panel may receive player interaction commands, in some example embodiments.

The EGM 10 may also include hardware configured to provide eye, motion or gesture tracking. For example, the EGM 10 may include at least one data capture camera device 25, which may be one or more cameras that detect one or more spectra of light, one or more sensors (e.g. optical sensor), or a combination thereof. The data capture camera device 25 may be used for eye, gesture or motion tracking of player, such as detecting eye movement, eye gestures, player positions and movements, and generating signals defining x, y and z coordinates. For example, the data capture camera device 25 may be used to implement tracking recognition techniques to collect player eye gaze data, player eye gesture data, and player movement data. An example type of motion tracking is optical motion tracking. The motion tracking may include a body and head controller. The motion tracking may also include an eye controller. The EGM 10 may implement eye-tracking recognition technology using cameras, sensors (e.g. optical sensor), data receivers and other electronic hardware to capture various forms of player input. The eye gaze, eye gesture, or motion by a player may interact with the interactive game environment or may impact the type of graphical animation effect. Accordingly, the EGM 10 may be configured to capture player eye gaze input, eye gesture input, and movement input as player interaction commands.

Embodiments described herein are implemented by physical computer hardware embodiments. The embodiments described herein provide useful physical machines and particularly configured computer hardware arrangements of computing devices, servers, electronic gaming terminals, processors, memory, networks, for example. The embodiments described herein, for example, is directed to computer apparatuses, and methods implemented by computers through the processing of electronic data signals.

The data capture camera device 25 may capture player data, such as button input, gesture input and so on. The data capture camera device 25 may include a camera, a sensor or other data capture electronic hardware. In some embodiments, EGM 10 may include at least one data capture camera device that continuously monitors the eye gaze of a player to collect player eye gaze data. The player may provide input to the EGM 10 using the eye gaze of the player. For example, using the eye gaze of the player, which may be collected as player eye gaze data, the player may select an interactive game to play, interact with a game component, or trigger a bonus interactive game.

Embodiments described herein involve computing devices, servers, electronic gaming terminals, receivers, transmitters, processors, memory, display, and networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

As described herein, the EGM 10 may be configured to provide an interactive game environment that concurrently displays a game to a player. The interactive game environment may be a 2D or 3D interactive game environment. The interactive game environment may provide a plurality of game components or game symbols based on the game data. The game data may relate to a primary interactive game or a bonus interactive game, or both. For example, the interactive game environment may comprise a 3D reel space that may have an active primary game matrix of a primary subset of game components. The bonus subset of game components may be different from the primary subset of game components. The player may view a viewing area of the interactive game environment, which may be a subset of the interactive game environment, on the display device 12, 14. The interactive game environment or the viewing area may be dynamically updated based on the eye gaze, eye gesture, or movement of the player in real-time or near real-time. The update to the interactive game environment or the viewing area may be a graphical animation effect displayed on the display device 12, 14. The update to the interactive game environment or the viewing area may be triggered based on the eye gaze, eye gesture, or movement of the player. For example, the update may be triggered by looking at a particular part of the viewing area for a pre-determined period of time, or looking at different parts of the viewing area in a pre-determined sequence, or widening or narrowing the eyes. The interactive game environment may be updated dynamically and revealed by dynamic triggers from game content of the primary interactive game in response to electronic data signals collected and processed by EGM 10.

For an interactive game environment, the EGM 10 may include a display device 12, 14 with auto stereoscopic 3D functionality. The EGM 10 may include a touch screen display for receiving touch input data to define player interaction commands. The EGM 10 may also include at least one data capture camera device, for example, to further receive player input to define player interaction commands. The EGM 10 may also include several effects and frame lights. The 3D enhancements may be an interactive game environment for additional game symbols.

The EGM 10 may include an output device such as one or more speakers. The speakers may be located in various locations on the EGM 10 such as in a lower portion or upper portion. The EGM 10 may have a chair or seat portion and the speakers may be included in the seat portion to create a surround sound effect for the player. The seat portion may allow for easy upper body and head movement during play. Functions may be controllable via an on-screen game menu. The EGM 10 is configurable to provide full control over all built-in functionality (lights, frame lights, sounds, and so on).

The EGM 10 may also include a plurality of effects lights and frame lights. The lights may be synchronized with enhancements of the game. The EGM 10 may be configured to control color and brightness of lights. Additional custom animations (color cycle, blinking, etc.) may also be configured by EGM 10. The custom animations may be triggered by certain gaming events.

In some embodiments, an EGM 10 may be implemented by a desktop computer, a laptop personal computer, a personal digital assistant (PDA), portable computing device, or other computerized platform. In some embodiments, the EGM 10 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 1C:
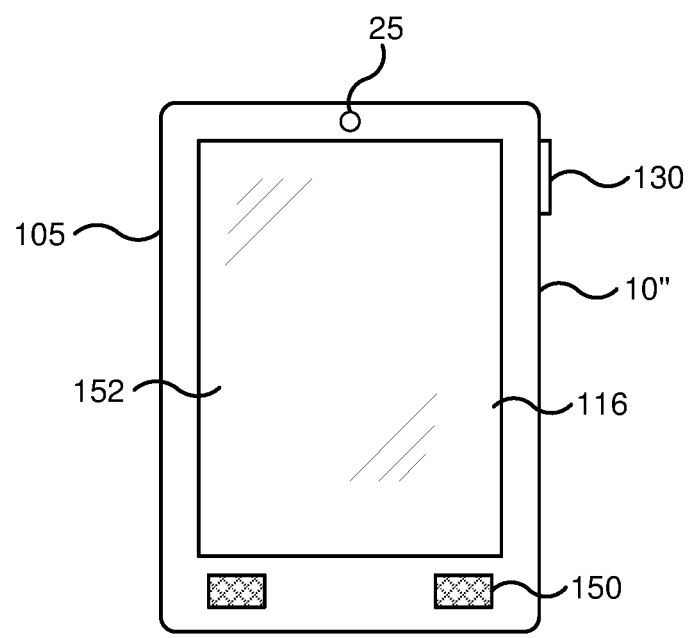
FIG. 1C is a perspective view of a handheld electronic gaming machine according to further embodiments.

For example, referring to FIG. 1C, an EGM 10" may be implemented as a handheld device including a compact housing 105 on which is mounted a touchscreen display device 116 including a digitizer 152. An input button 130 may be provided on the housing and may act as a power or control button. A camera device 25 may be provided in a front face of the housing 105. The camera device 25 may provide multi-user gaze detection that may provide gaze data corresponding to multiple players and/or non-players. The housing 105 may include one or more speakers 150. In the EGM 10", various input buttons described above, such as the cashout button, gameplay activation button, etc., may be implemented as soft buttons on the touchscreen display device 116. Moreover, the EGM 10" may omit certain features, such as a bill acceptor, a ticket generator, a coin acceptor or dispenser, a card reader, secondary displays, a bet display, a credit display, etc. Credits can be deposited in or transferred from the EGM 10" electronically.

Figure 2:
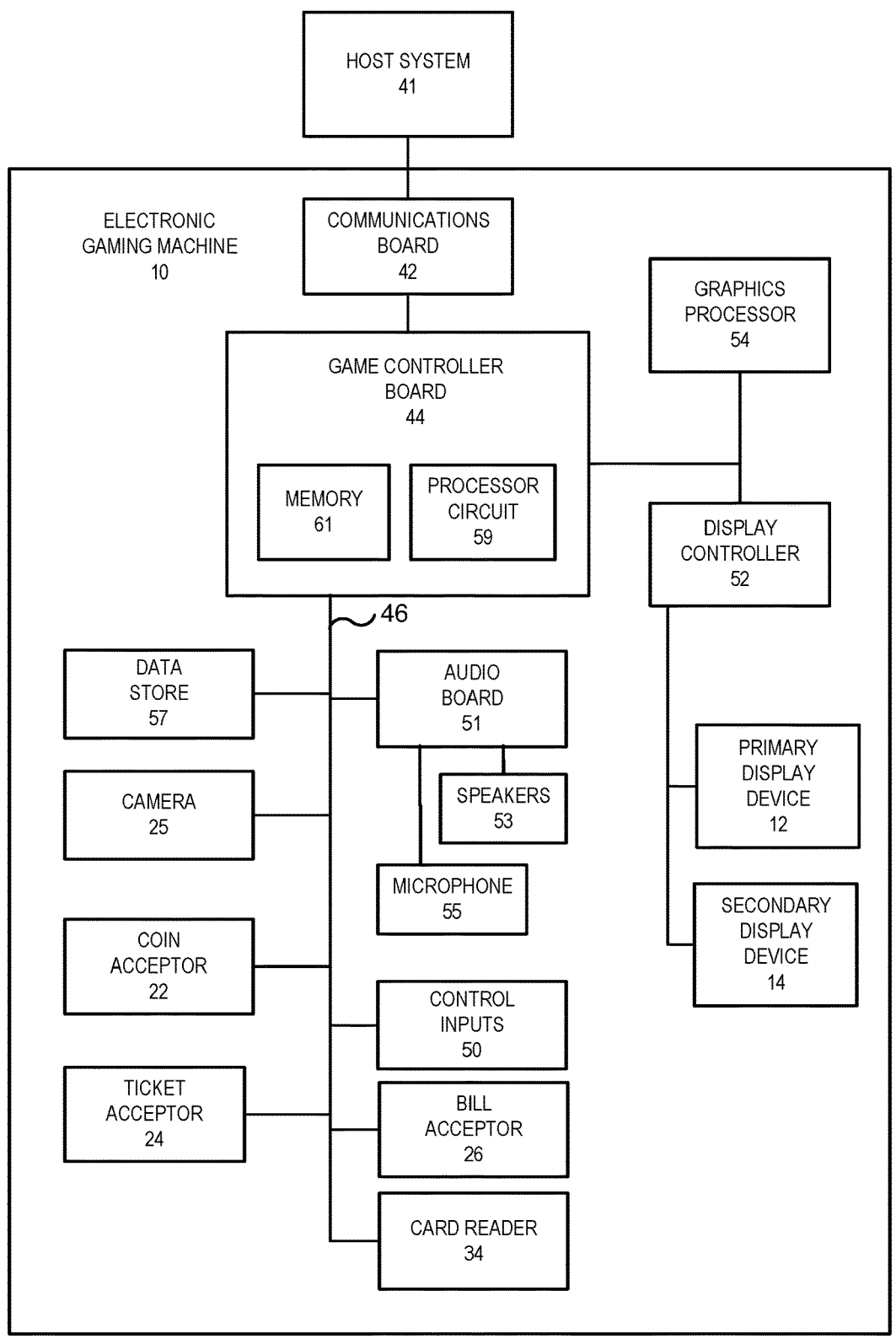
FIG. 2 is a schematic diagram of an electronic gaming machine linked to a casino host system according to some embodiments.

FIG. 2 is a block diagram of some components of EGM 10 according to some embodiments. The EGM 10 is shown linked to the casino's host system 41 via network infrastructure. These hardware components are particularly configured to provide at least one interactive game. These hardware components may be configured to provide at least one interactive game and at least one bonus game, and in some cases to provide a plurality of concurrently displayed interactive games.

A communications board 42 may contain circuitry for coupling the EGM 10 to network. The communications board 42 may include a network interface allowing EGM 10 to communicate with other components, to access and connect to network resources, to serve an application, to access other applications, and to perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including any combination of these. The EGM 10 may communicate over a network using a suitable protocol, such as the G2S protocols.

The communications board 42 may communicate, transmit and receive data using a wireless transmitter, or it may be wired to a network, such as a local area network running throughout the casino floor, for example. The communications board 42 may set up a communication link with a master controller and may buffer data between the network and a game controller 44. The communications board 42 may also communicate with a network server, such as in accordance with the G2S standard, for exchanging information to carry out embodiments described herein.

The game controller 44 includes a memory 61 and a processor circuit 59 for carrying out program instructions stored in the memory and for providing the information requested by the network. Game data for one or more game programs may be stored in the memory 61. The processor circuit 59 may be a multi-core processor including two or more independent processing units. Each of the cores in the processor circuit 59 may support multi-threading operations, i.e., may have the capability to execute multiple processes or threads concurrently. Additionally, the processor circuit 59 may have an on-board memory cache. An example of a suitable multi-core, multithreaded processor circuit is an Intel® Core i7-7920HQ processor, which has four cores that support eight threads each and has an 8 MB on-board cache. The game controller 44 executes game routines using game data stores in a data store 57 accessible to the game controller 44 and cooperates with a graphics processor 54 and a display controller 52 to provide games with enhanced interactive game components. The graphics processor 54 may have an integrated high-speed dedicated graphics memory.

The EGM 10 may include at least one data capture camera device 25 for implementing the gaming enhancements, in accordance with some embodiments. The EGM 10 may include the data capture camera device 25, one or more sensors (e.g. optical sensor), or other hardware device configured to capture and collect in real-time or near real-time data relating to the eye gaze, eye gesture, and/or movement of multiple users, or any combination thereof.

In some embodiments, the data capture camera device 25 may be used for eye gaze tracking, eye gesture tracking, motion tracking, and movement recognition. The data capture camera device 25 may collect data defining x, y and z coordinates representing eye gaze, eye gestures, and movement of multiple users.

In some embodiments, the data capture camera device 25 may track a position of each eye of a player, spectator and/or observer relative to display device 12, 14, as well as a direction of focus of the eyes and a point of focus on the display device 12, 14, in real-time or near real-time. The focus direction may be the direction at which the player's line of sight travels or extends from his or her eyes to display device 12, 14. The focus point may be referred to as a gaze point and the focus direction may sometimes be referred to as a gaze direction. In one example, the focus direction and focus point can be determined based on various eye tracking data such as positions of users' eyes, a position of their head, positions and/or sizes of the pupils, corneal reflection data, and/or sizes of the irises. All of the above-mentioned eye tracking or movement data, as well as the focus direction and focus point, may be examples of, and referred to as, users' eye movements or user movement data.

In some embodiments, the data capture camera device 25 may monitor the eye gaze, eye gesture, and/or movement of two or more people, who may be two or more players of the interactive game, to collect the player eye gaze data, player eye gesture data, and/or player movement data. The player eye gaze data, player eye gesture data, and/or player movement data may be used such that both players may be able to play the interactive game simultaneously. The interactive game may include aspects of both cooperative and competitive play. In some embodiments, the player eye gesture data of one or more spectators may be reported to a player during game play.

In addition, focus points may extend to or encompass different visual fields visible to the users. For example, a foveal area may be a small area surrounding a fixation point on the display device 12, 14 directly connected by a (virtual) line of sight extending from the eyes of a player. This foveal area in the player's vision may generally appear to be in sharp focus and may include one or more game components and the surrounding area. A focus point may include the foveal area immediately adjacent to the fixation point directly connected by the (virtual) line of sight extending from the users' eyes.

The display controller 52 may control one or more of display device 12, 14 the using graphics processor 54 to display a viewing area that may include one or more visible game components based on the game data of a plurality of concurrently displayed interactive games.

The display controller 52 may, in response to detection of the control command from the game controller 44 based on the user eye gaze data, user eye gesture data, or user movement data, control display device 12, 14 using graphics processor 54. Display controller 52 may update the viewing area to trigger a graphical animation effect displayed on one or both of display device 12, 14 representative of a visual update to the visible game components in the viewing area, the visual update based on the user eye gaze data, user eye gesture data, or user movement data.

Peripheral devices/boards in the EGM 10 may communicate with the game controller 44 via a bus 46 using, for example, an RS-232 interface. Such peripherals may include a bill acceptor 26, a coin acceptor 22, a smart card reader or other type of credit card reader 34, and player control inputs 50 (such as buttons or a touch screen).

The player control inputs 50 may include the keypad, the buttons, touchscreen display, gesture tracking hardware, and data capture device as described herein. Other peripherals may be one or more cameras used for collecting player input data, or other player movement or gesture data that may be used to trigger player interaction commands. The display device 12, 14 may be a touch sensitive display device. Player control input 50 may be integrated with the display device 12, 14 to detect player interaction input at the display device 12, 14.

The game controller 44 may also control one or more devices that produce the game output including audio and video output associated with a particular game that is presented to the user. For example, an audio board 51 may convert coded signals into analog signals for driving speakers 53. Some embodiments provide that an audio board may convert audio signals, either analog or digital, that are received via a microphone 55, into coded signals.

The game controller 44 may be coupled to an electronic data store storing game data for one or more interactive games. The game data may be for a primary interactive game and/or a bonus interactive game. The game data may, for example, include a set of game instructions for each of the one or more interactive games. The electronic data store may reside in a data storage device, e.g., a hard disk drive, a solid-state drive, or the like. Such a data storage device may be included in EGM 10, or may reside at the host system 41. In some embodiments, the electronic data store storing game data may reside in the cloud.

The card reader 34 reads cards for player and credit information for cashless gaming. The card reader 34 may read a magnetic code on a conventional player tracking card, where the code uniquely identifies the player to a host system at the venue. The code is cross-referenced by the host system 41 to any data related to the player, and such data may affect the games offered to the player by the gaming terminal. The card reader 34 may also include an optical reader and printer for reading and printing coded barcodes and other information on a paper ticket. A card may also include credentials that enable the host system 41 to access one or more accounts associated with a user. The account may be debited based on wagers by a user and credited based on a win.

The graphics processor 54 may be configured to generate and render animation game enhancements based on game data as directed by the game controller 44. The game enhancements may involve an interactive game environment that may provide one or more game components and graphical animation effects. The graphics processor 54 may be a specialized electronic circuit designed for image processing (including 2D and 3D image processing in some examples) in order to manipulate and transform data stored in memory to accelerate the creation of images in a frame buffer for output to the display by way of the display controller 52. The graphics processor 54 may redraw various game enhancements as they dynamically update. The graphics processor 54 may cooperate with game controller 44 and display controller 52 to generate and render enhancements as described herein. The graphics processor 54 may generate an interactive game environment that may provide one or more game components, for example, a 3D reel space of a plurality of game components. The graphics processor 54 may generate graphical animation effects to represent a visual update to the game components in the viewing area, the visual update based on the player eye gaze data, player eye gesture data, player movement data, or any combination thereof.

The display controller 52 may require a high data transfer rate and may convert coded signals to pixel signals for the display. The display controller 52 and the audio board 51 may be directly connected to parallel ports on the game controller 44. The electronics on the various boards may be combined onto a single board. The display controller 52 may control output to one or more display device 12, 14 (e.g. an electronic touch sensitive display device). The display controller 52 may cooperate with graphics processor 54 to render animation enhancements on the display device 12, 14.

The display controller 52 may be configured to interact with graphics processor 54 to control the display device 12, 14 to display a viewing area defining the interactive game environment including navigation to different views of the interactive game environment. Player control inputs 50 and the data capture camera device 25 may continuously detect player interaction commands to interact with interactive game environment. For example, the player may move a game component to a preferred position, select a game component, or manipulate the display of the game components.

In some embodiments, the display controller 52 may control the display device 12, 14 using the graphics processor 54 to display the viewing area that may have one or more game components. In response to the detection of the control command based on the player eye gaze data, player eye gesture data, player movement data, or any combination thereof, the display controller 52 may trigger a graphical animation effect to represent a visual update to the game components in the viewing area.

Reference is now made to FIG. 3, which is a schematic block diagram that illustrates operations of a gaming device according to some embodiments herein. As provided herein, some embodiments of a gaming device may include a display device, an image capture device that may capture images of the eyes of multiple users of the gaming device, a processor circuit and a memory that includes machine-readable instructions that, when executed, cause the processor circuit to perform operations 300. For example, operations may include generating gaze direction data corresponding to gaze directions of the eyes of the multiple users (block 302). In some embodiments, the multiple users are both players of the gaming device and the gaze direction data corresponding to each of the multiple players may be determined. Some embodiments provide that the multiple users include a player and a non-playing observer and/or spectator. As used herein, the term "non-player" may refer to any spectator and/or observer that is not playing the gaming device at a given time. In some embodiments, the multiple users may not include any players and may include only multiple non-players.

Operations 300 may further include modifying a gaming device function based on the gaze direction data of the multiple users (block 304). In some embodiments, modifying a gaming device function includes modifying a graphic and/or a graphical element displayed by the gaming device, a game feature of the gaming device, a bonus feature of the gaming device and/or an environmental property, such as a visual or audio property, of the gaming device.

Figure 4:
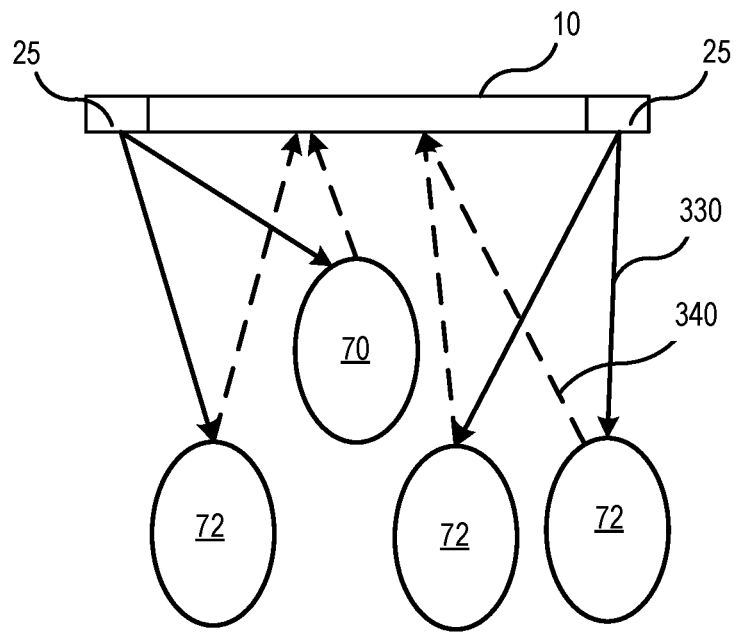
FIG. 4 is a partial schematic diagram illustrating a top view of a gaming device using gaze direction data corresponding to one player and multiple users of a gaming device according to some embodiments.

Brief reference is now made to FIG. 4, which is a partial schematic diagram illustrating a top view of a gaming device using gaze direction data corresponding to multiple users of a gaming device according to some embodiments. As illustrated, a gaming device 10 includes one or more image capture devices 25 that are configured to capture image data corresponding to the eyes of multiple users 70, 72. The multiple users may include a player 70 and multiple non-players 72. Some embodiments provide that each of the users 70, 72 is looking at a location on or near the gaming device 10. The location corresponds to a gaze direction 340 for each of the users 70, 72. Gaze direction data is determined using the image data 330 that is received via the image capture devices 25.

In some embodiments, the gaze direction data corresponds to user that include a player 70 of the gaming device 10 and multiple non-players 72. Some embodiments provide that it may be determine how many of the nonplayers 72 are gazing at the same location that the player 70 is gazing at. In some embodiments, the gaming device function may be modified to include a graphic representing how many of the of nonplayers 72 are gazing at the same location as the player 70. For example, in the present embodiments, two of the three the nonplayers 72 are gazing at a location that is not the same as the location that the player 70 is gazing while one of the nonplayers 72 is gazing at the same location as the player 70. In such embodiments, the graphic representing how many of the nonplayers 72 are gazing may be expressed as a meter that indicates what portion of nonplayers is looking at the same location as the player 70. In some embodiments, the graphic may include a color and/or brightness change of a portion of the display based on the portion of nonplayers 72 looking at the same location as the player 70.

Figure 5:
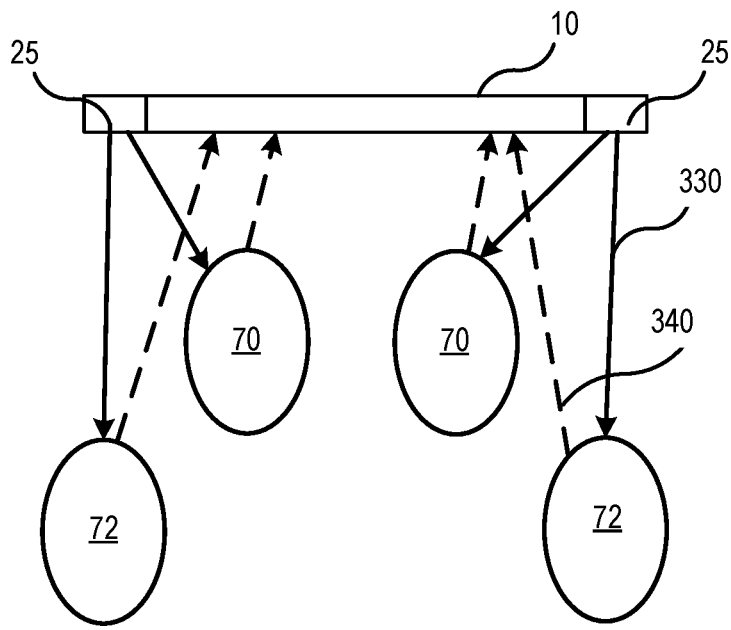
FIG. 5 is a partial schematic diagram illustrating a top view of a gaming device using gaze direction data corresponding to multiple players and multiple users of a gaming device according to some embodiments.

Brief reference is now made to FIG. 5, which is a partial schematic diagram illustrating a top view of a gaming device using gaze direction data corresponding to multiple users of a gaming device according to some embodiments. As illustrated, a gaming device 10 includes one or more image capture devices 25 that are configured to capture image data corresponding to the eyes of multiple users 70, 72. The multiple users may include multiple players 70 and multiple non-players 72. Some embodiments provide that each of the users 70, 72 is looking at a location on or near the gaming device 10. The location corresponds to a gaze direction 340 for each of the users 70, 72. Gaze direction data is determined using the image data 330 that is received via the image capture devices 25.

Some embodiments provide that relative interest in the game play of the different players 70 may be determined using the gaze direction data corresponding to the non-players 72. For example, operations may include determining how many of the nonplayers 72 are gazing at display content that corresponds to each of the players 70. In some embodiments, the gaming device function may be modified to include and/or modify a graphic that represents how many and/or what portion of the non-players 72 are gazing at each of the first and second display content. In some embodiments, a given player 70, may be awarded points, credits and/or a bonus award, among others, responsive to determining that that more of the non-players 72 are gazing at the display content corresponding to that given player 70. Some embodiments provide that the interest in the play of multiple players 70 may be determined based on which of the first or second display content is being looked at the most by the non-players 72. For example, if a greater portion of the non-players 72 is looking at the given player 70 than at another player, then the relative interest in the play of the given player may be determined to be greater than another player 70.

Figure 6:
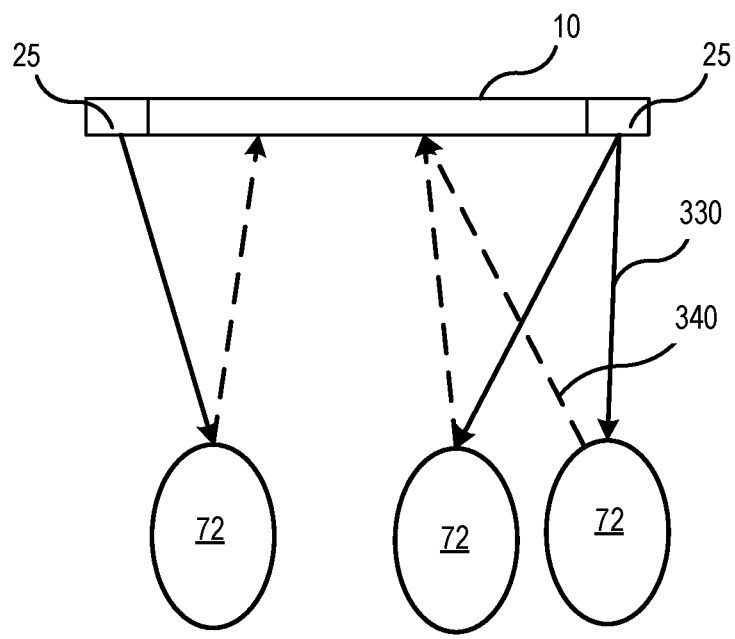
FIG. 6, which is a partial schematic diagram illustrating a top view of a gaming device using gaze direction data corresponding to multiple non-playing users of a gaming device according to some embodiments.

Brief reference is now made to FIG. 6, which is a partial schematic diagram illustrating a top view of a gaming device using gaze direction data corresponding to multiple non-playing users of a gaming device according to some embodiments. As illustrated, a gaming device 10 includes one or more image capture devices 25 that are configured to capture image data corresponding to the eyes of multiple users 72. The multiple users may include multiple non-players 72 without anyone playing the gaming device 10. Some embodiments provide that each of the non-players 72 is looking at a location on or near the gaming device 10. The location corresponds to a gaze direction 340 for each of the non-players 72. Gaze direction data is determined using the image data 330 that is received via the image capture devices 25. In some embodiments, the gaming device function is modified to include a first graphic and a second graphic that are different from one another. The system may determine a first quantity of the non-players that are gazing at the first graphic and a second quantity of the non-players that are gazing at the second graphic. User interest in different game features and or properties may be determined by comparing the first quantity and the second quantity. For example, content in the first graphic may be determined to generate more interest based on more of the non-players 72 gazing in the direction of the first graphic than the second graphic.

Figure 7:
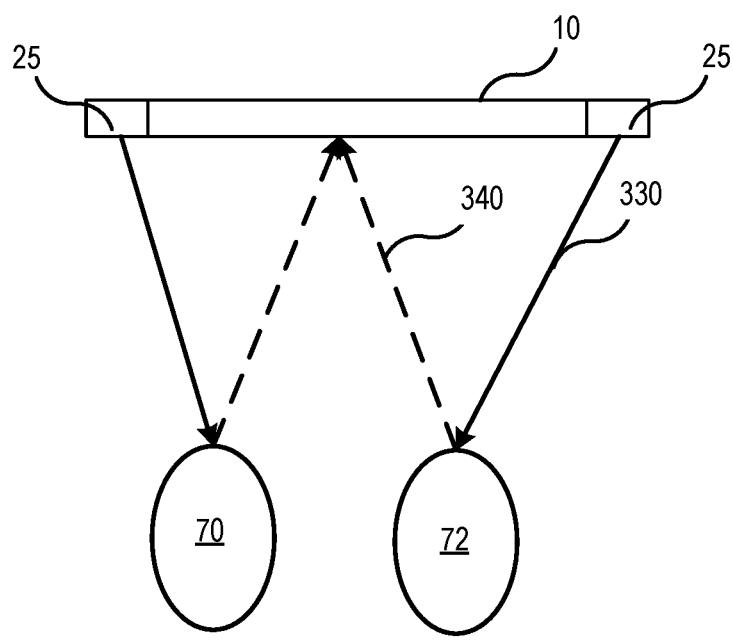
FIG. 7, which is a partial schematic diagram illustrating a top view of a gaming device using gaze direction data corresponding to players and/or non-playing users of a gaming device according to some embodiments.

Brief reference is now made to FIG. 7, which is a partial schematic diagram illustrating a top view of a gaming device using gaze direction data corresponding to players and/or non-playing users of a gaming device according to some embodiments. In some embodiments, the gaming device function is modified to display a graphic that is intended to attract the users 70, 72 to gaze at a given location on the display device. Data corresponding to the gaze direction 340 may be compared to a known location of the graphic to determine a value of a gaze direction error. Based on the value of the gaze direction error, values used in generating the gaze direction data may be calibrated. Although illustrated as a single player 70 and non-player 72, embodiments herein may be application for any combination and/or quantities of players 70 and non-players 72.

Figure 8:
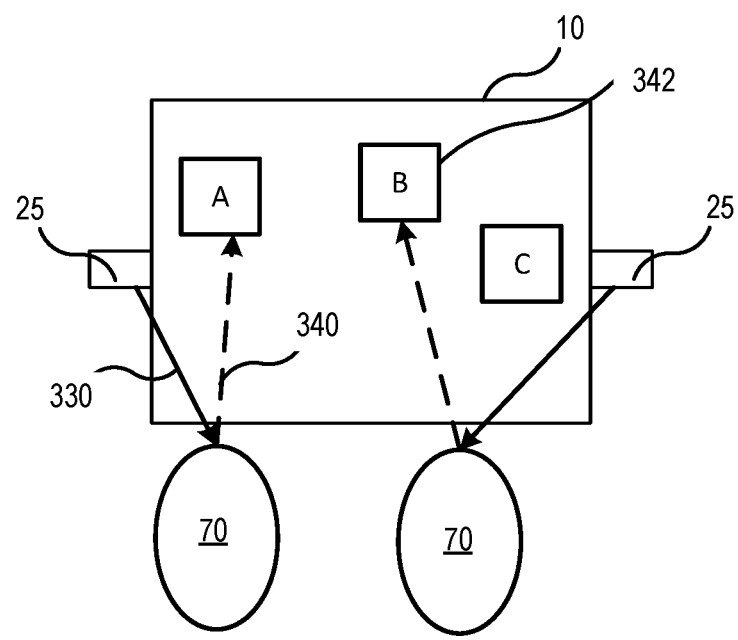
FIG. 8, which is a partial schematic diagram illustrating a top view of a gaming device using gaze direction data corresponding to players and/or non-playing users of a gaming device according to some embodiments.

Brief reference is now made to FIG. 8, which is a partial schematic diagram illustrating a top view of a gaming device using gaze direction data corresponding to players and/or non-playing users of a gaming device according to some embodiments. As illustrated, a gaming device 10 includes one or more image capture devices 25 that are configured to capture image data corresponding to the eyes of multiple users. In some embodiments, the multiple users may include multiple players 70. Although not illustrated in this figure, the users may include one or more non-players in addition to the players 70. Some embodiments provide that each of the players 70 is looking at a location on or near the gaming device 10. The location corresponds to a gaze direction 340 for each of the players 70. Gaze direction data is determined using the image data 330 that is received via the image capture devices 25.

In some embodiments, the gaming device function is modified to display multiple graphical elements 342 that are each selectable by either of the players based on the respective gaze direction data. For example, one of the players 70 may select a graphical element 342 identified as "A" by looking at that graphical element 342 while another of the players 70 may select a graphical element 342 identified as "B" by looking at that graphical element 342.

In some embodiments, the different graphical element 342 may each correspond to different point values that may correspond to points used in a competition, bonus award points, free spins, credits, and/or non-wagering prizes such as meals, and/or rewards system credits, among others.

In some embodiments, in response to a player selecting a more than one of the graphical elements 342, the player may be awarded a sum of point values of the multiple graphical elements 342. In some embodiments, once a graphical element 342 is selected by a player 70, that graphical element 342 is no longer available for selection by another player 70. Some embodiments include timed events in which players 70 can race against one another to select the most graphical elements 342. In some embodiments, the competition may include an accuracy element in which the more accurate the gaze of the player 70 is, the more points and/or value may be awarded to that player 70. In some embodiments, the graphical elements 342 may be displayed in a sequence in which the player 70 may be rewarded based on accurately following the sequence. In some embodiments, selection of a graphical element 342 may be determined based on the player 70 looking at the graphical element 342 for a predefined period of time.

In some embodiments, the gaming device function is modified to display a graphical element at a different location on the display for a given time interval to attract the players 70 to try to gaze at the graphical element before it disappears. In some embodiments, the player that uses gaze to select the graphical element 342 first may be awarded with a higher score than other players 70.

In some embodiments, the gaming device function is modified to display a graphical elements 342 at different relative locations on the display and to sequentially highlight different ones of the graphical elements 342 for a given time interval to attract the players 70 to try to gaze at the respective graphical element 342 before the highlighting changes to another graphical element 342. Some embodiments provide that a player 70 is awarded with a higher score than another player responsive to selecting the graphical element 342 that is highlighted first.

Figure 9:
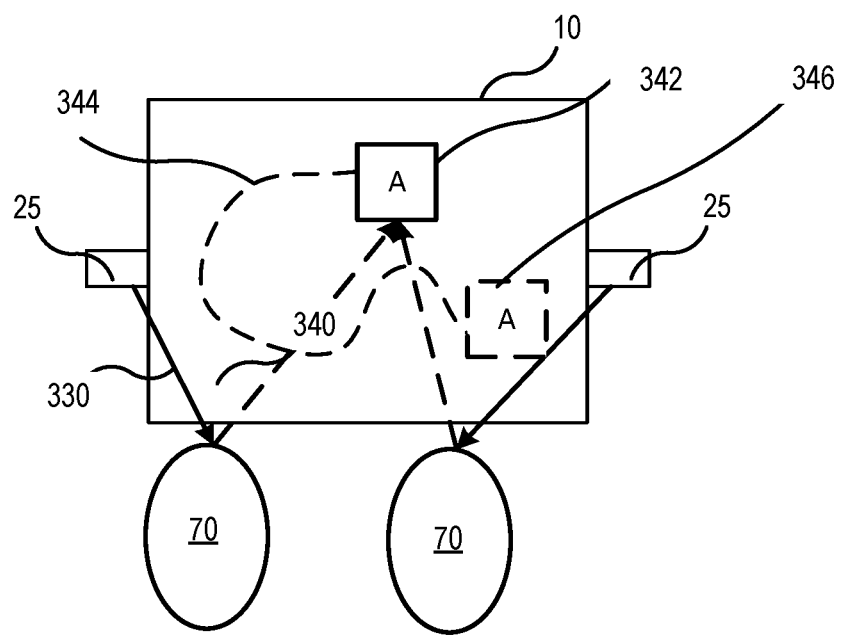
FIG. 9, which is a partial schematic diagram illustrating a perspective front view of a gaming device using gaze direction data corresponding to players of a gaming device according to some embodiments.

Brief reference is now made to FIG. 9, which is a partial schematic diagram illustrating a perspective front view of a gaming device using gaze direction data corresponding to players of a gaming device according to some embodiments. As illustrated, a gaming device 10 includes one or more image capture devices 25 that are configured to capture image data corresponding to the eyes of multiple users. In some embodiments, the multiple users may include multiple players 70. Although not illustrated in this figure, the users may include one or more non-players in addition to the players 70.

In some embodiments, the gaming device function is modified to display a graphical element 342 that moves around the display to attract the players 70 to try to continuously gaze at the graphical element 342 as the graphical element 342 moves along a path 344. Some embodiments provide that a player 70 is awarded with a higher score than another player responsive to the that player 70 gazing at the graphical element 342 during a time period in which the graphical element 342 moves along the path 344 from a starting position 346. In some embodiments, the graphical element 342 may move at different speeds and with different levels of direction change frequency and/or intensity to provide different levels of difficulty.

Figure 10:
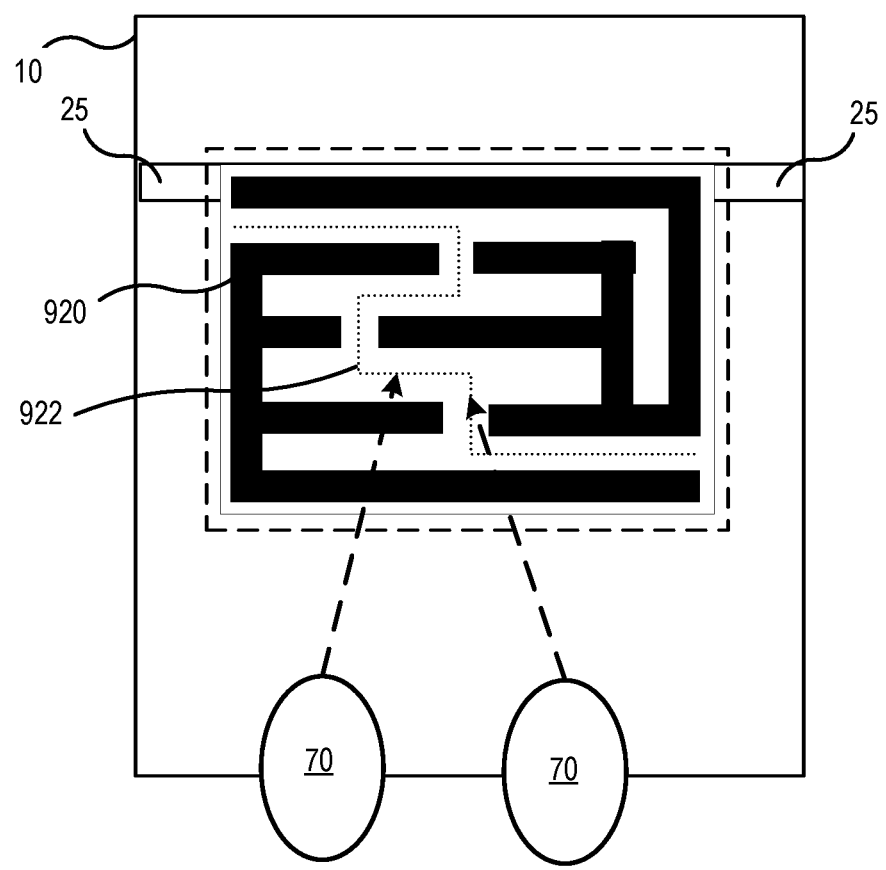
FIG. 10, which is a partial schematic diagram illustrating a perspective front view of a gaming device using gaze direction data corresponding to players of a gaming device according to some embodiments.

Brief reference is now made to FIG. 10, which is a partial schematic diagram illustrating a perspective front view of a gaming device using gaze direction data corresponding to players of a gaming device according to some embodiments. As illustrated, a gaming device 10 includes one or more image capture devices 25 that are configured to capture image data corresponding to the eyes of multiple users. In some embodiments, the multiple users may include multiple players 70. Although not illustrated in this figure, the users may include one or more non-players in addition to the players 70.

Some embodiments provide that the gaming device function may display an image of a maze 920 that includes multiple pathways 922 defined therein. The players 70 may cause a pathway 922 to be graphically traversed by visually following the pathway. As the player 70 visually traverses the pathway 922, gaze detection data is generated and the player's position in the pathway 922 is graphically displayed. In some embodiments, a single player 70 may compete against a timer to determine if the player 70 can complete the maze 920 during a given time interval. Some embodiments provide that multiple players 70 may compete against one another to determine which player 70 can complete the maze 920 and/or traverse more of the maze 920.

Figure 11:
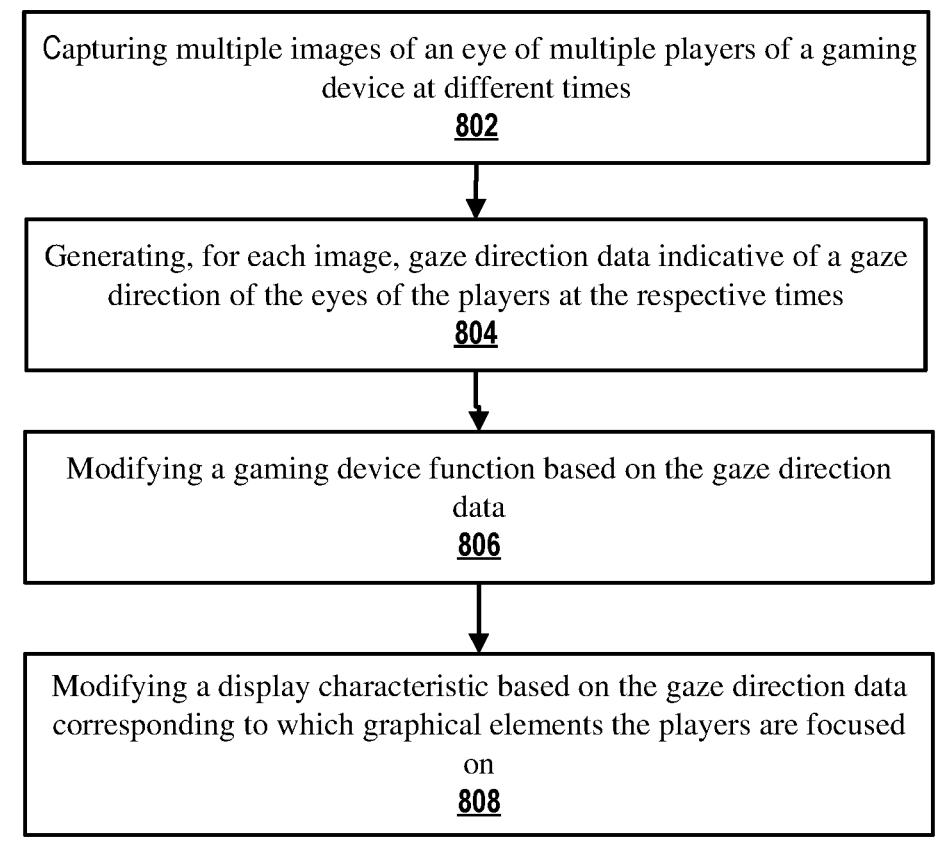
FIG. 11, a schematic block diagram that illustrates operations for methods using gaze direction data of multiple users according to some embodiments.

Reference is now made to FIG. 11, which is a schematic block diagram that illustrates operations for methods using gaze direction data of multiple users according to some embodiments. According to some embodiments, methods 800 may include capturing multiple images of an eye of each of multiple players of a gaming device (block 802). Some embodiments provide that the images are captured using an image capture device and that the images may be captured at multiple different times for each of the multiple eyes and/or users. Operations may further include generating, for each image of the multiple images, gaze direction data indicative of a gaze direction of the eyes of the players at the respective times (block 804). Based on the gaze direction data of the of players, operations may further include modifying a gaming device function (block 806).

In some embodiments, the gaming device function includes multiple defined locations on a display of the gaming device that each correspond to possible answers of a question provided to the players and one of the defined locations corresponds to a correct answer to the question. In such embodiments, the players that have gaze direction data that corresponds to the defined location that of the correct answer may be awarded a higher score than the other players.

In some embodiments, gaze direction data is generated corresponding to respective ones of the multiple players. For example, first gaze direction data may be generated for a first player and second gaze direction data may be generated for a second player. In such embodiments, the gaming device function may be modified to display multiple graphical elements at different relative locations on the display to attract the first player and the second player to gaze at the respective graphical elements. Some embodiments provide that the first and second players are awarded a score based on an amount of time that the first and second gaze direction data indicates that the first gaze direction and the second gaze direction are both directed to the graphical element.

Some embodiments further include modifying a display characteristic based on which of the graphical elements the players focus their gaze based on the gaze direction data (block 808).

Figure 12:
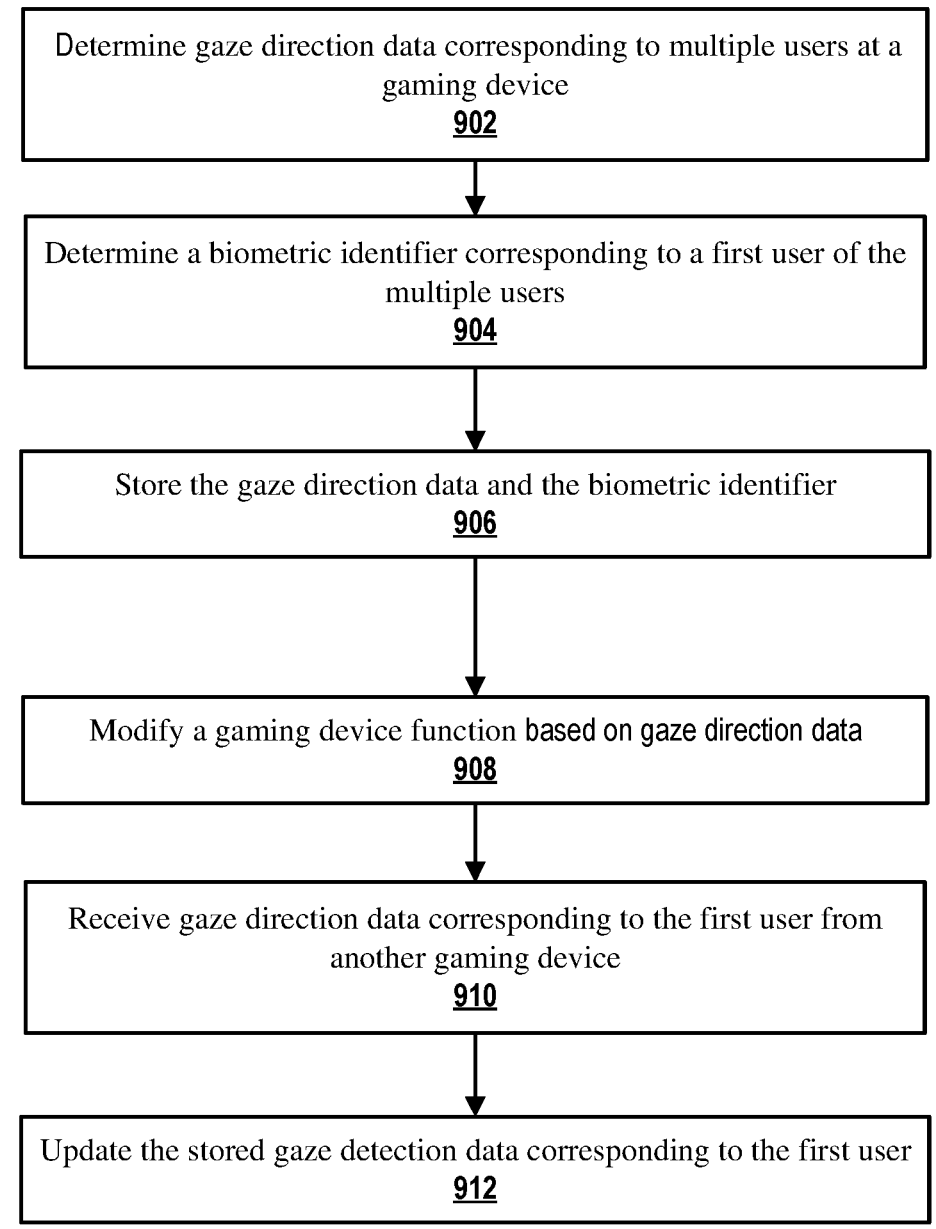
FIG. 12, a schematic block diagram that illustrates operations for systems using gaze direction data of multiple users according to some embodiments.

Reference is now made to FIG. 12, which a schematic block diagram that illustrates operations for systems using gaze direction data of multiple users according to some embodiments. Operations may include determining gaze direction data corresponding to multiple users at a gaming device (block 902) and determining a biometric identifier corresponding to one of the multiple users (block 904). Operations may further include storing the gaze direction data and the biometric identifier corresponding to the user (block 906). Operations may further include modifying a gaming device function based on the gaze direction data corresponding to the plurality of users (block 908).

Some embodiments include receiving gaze direction data corresponding to a given user from another gaming device (block 910) and updating the stored gaze detection data corresponding to that user based on the gaze direction data received into the other gaming device (block 912).

Referring back to FIG. 2, gaze direction data may be obtained in a number of ways. For example, the game controller 44 may determine the location of the eye gaze relative to the viewing area based on the position of the player's eyes relative to the EGM 10 and an angle of the player's eyes. The data capture camera device 25 may monitor the position of the player's eyes relative to EGM 10, and may also monitor the angle of the player's eyes to collect display mapping data. The angle of the player's eyes may define the focus of the eye gaze, which may be a line of sight relative to the display device 12, 14. Based on the display mapping data, which may include the position of the player's eyes relative to the EGM 10 and an angle of the player's eyes or the line of sight relative, the game controller 44 may be configured to determine the direction and length of a virtual arrow projecting from the player's eyes. The game controller 44 may determine where the virtual arrow intersects with the display device 12, 14. The intersection of the virtual arrow and display device 12, 14 may represent where the eye gaze of the player 70 is focused on the display device 12, 14. The display device 12, 14 may be controlled by display controller 52 to display the viewing area. The game controller 44 may identify coordinates on the display device 12, 14 corresponding to the player eye gaze data and may map the coordinates to the viewing area to determine the eye gaze of the player 70 relative to the viewing area. The mapping of the coordinates may be included in data that may be referred to as gaze detection data. The EGM 10 may determine the location of the viewing area that the player 70 is looking at, which may be useful for the EGM 10 to determine how the player 70 is interacting with the interactive game. In some embodiments, the eye gaze of the player 70 may be expressed in 2D or 3D and may be mapped to a 2D or 3D viewing area, depending on whether the interactive game is a 2D interactive game or a 3D interactive game.

Accuracy of the gaze direction data may be beneficial in providing data corresponding to the calibration of the gaze detection system. For example, one challenge with the gaze detection technology is calibrating the hardware and software for the current user. Even when that is achieved, the calibration may vary over time for various reasons. One reason may be that the player 70 moves around in his or her seat over time. Another reason may be that the player 70 becomes tired and changes posture and/or body position over time. It may be advantageous to have regular calibration data to provide an optimum player experience.

While playing an interactive game on the EGM 10, the eyes of a player 70 may move suddenly without the player 70 being conscious of the movement. The eyes of the player 70 may demonstrate subconscious, quick, and short movements, even if the player 70 is not actively controlling their eyes to move in this manner. These subconscious, quick, and short eye movements may affect the game controller's determination of the eye gaze of the player based on the player eye gaze data. Accurate processing of the player eye gaze data related to these subconscious, quick, and short eye movements may result in detecting the location of the eye gaze of the player representative of eye twitching or erratic eye movements not reflective of the player's intended eye gaze, and may be distracting to the player 70. It may be useful for the player eye gaze data to be filtered to not reflect these quick and short eye movements, for example, so the determination of the eye gaze of the player 70 relative to the viewing area by the game controller reflects the intended eye gaze of the player 70. It may also be useful for the portion of the player eye gaze data representative of the subconscious, quick, and short eye movements to have less determinative effect on the determined location of the eye gaze of the player. In some embodiments, the game controller 44 may define a filter movement threshold, wherein the game controller, prior to determining a location of the eye gaze of the player 70 relative to the viewing area using the player eye gaze data collected by the data capture camera device 25 and updating the rendering of the viewing area, determines that the player eye gaze meets the filter movement threshold. The data capture camera device 25 may collect player eye gaze data.

The game controller 44 may process the player eye gaze data to correspond with a location on the viewing area. The game controller 44 may determine where the player 70 is looking at on the viewing area based on a certain number of previously recorded player eye gaze data, for example, by tracking the last given quantity of eye gaze positions to average out where on the viewing area the player is looking. The game controller 44 may limit the amount of previously recorded player eye gaze data that is used to determine where on the viewing area the player is looking. The game controller 44 may filter out, or "smooth out", player eye gaze data outside of the pre-determined filter movement threshold, which may represent sudden and subconscious eye movement. The game controller 44 may map the eye gaze of the player 70 to the viewing area using at least a portion of the filtered player eye gaze data to determine the location of the viewing area at which the player is looking, in order to map the player's eye gaze to the viewing area.

As another example, the game controller 44 may delay in processing the player eye gaze data associated with subconscious, quick, and short eye movements, so the detected location of the eye gaze of the player 70 does not represent twitching or sudden unconscious eye movements which may trigger animation effects causing an unpleasant user experience. Large eye motions may also be associated with more delay in processing and more smoothing. In some embodiments, the game controller may partition the player eye gaze data associated with large eye motions into data representative of shorter eye motions. The game controller 44 may analyze the player eye gaze data to determine which data is associated with subconscious eye movement or with conscious eye movement based on a filter movement threshold, a time threshold, movement threshold, or any combination thereof. Player eye gaze data associated with quick eye movements over a certain period of time may be determined by the game controller 44 to be subconscious eye movement. The game controller 44 may delay in processing this portion of data so the detected location of the eye gaze of the player may be stable and may not distract the player, or the game controller may filter out this data and not process it. Player eye gaze data associated with large eye movements over a certain period of time may be determined by the game controller to be the player losing focus or being distracted. The game controller 44 may similarly delay in processing this portion of data or not process this portion of data. In some embodiments, game controller 44 may filter out, or "smooth out" player eye gaze data, player eye gesture data, player movement data, or a combination thereof, that may exceed the filter movement threshold, in the manner described herein.

The locations where the EGM 10 may be used may have a variety of lighting conditions. For example, the EGM 10 may be used in a restaurant, a hotel lobby, an airport, and a casino. It may be brighter in some locations and darker in other locations, or the light quality may fluctuate from brightness to darkness. In some embodiments, EGM 10 may include an infrared light source that illuminates the player 70. The infrared light sources may not interfere with the eyes of the player 70. In some embodiments, the data capture camera device 25 may be an infrared data capture camera device. The infrared data capture camera device may collect player eye gaze data, player eye gesture data, and player movement data without being affected by the lighting conditions of the locations where EGM 10 may be used. In some embodiments, the EGM 10 may have a plurality of light sources providing a plurality of spectra of light, and the data capture camera device 25 may be a plurality of data capture camera devices configured to detect a plurality of spectra of light, so the data capture camera device 25 may collect player eye gaze data, player eye gesture data, and player movement data without being affected by the lighting conditions of the locations where EGM 10 may be used.

A player 70 that plays an interactive game using EGM 10 may be wearing glasses. The glasses of the player may cause refractions of the light that illuminates the player 70. This may affect the data capture camera device 25 while it monitors the eye gaze, eye gesture, and/or movement of the player. Glasses that comprise an infrared filter may also interfere with or affect the data capture camera device 25 while it monitors the eye gaze, eye gesture, and/or movement of the player. The EGM 10 may recognize that the player may be wearing glasses. For example, as the interactive game commences, display controller 52 may display on display device 12, 14 using graphics processor 54 a question asking the player if he or she is wearing glasses. The player may provide input indicating whether he or she is wearing glasses, such as, but not limited to, with an audio command, touch command, or with the player's eye gaze. As other example, the game controller 44 may recognize, based on processing the player eye gaze data from the data capture camera device 25, that the light illuminating the player 70 may be refracted, and may determine that the player 70 is wearing glasses. When EGM 10 recognizes that the player 70 may be wearing glasses, the game controller 44 may perform additional and/or more stringent filtering functions as described herein to compromise for the player's use of glasses and to accommodate the refractions of the light that illuminates the player. For example, the filter movement threshold may be set to be higher for players 70 who wear glasses.

In some embodiments, the player 70 may play an interactive game with EGM 10 in communication with a mobile device. Depending on the game data of the interactive game, the player may play the interactive game on EGM 10, on the mobile device, or on both. The player 70 may play the interactive game using their eye gaze, eye gestures, movement, the interface of the mobile device, or any combination thereof. The player 70 may play the interactive game using only the eye gaze of the player 70 while the player 70 holds on to the mobile device with one or more hands. The mobile device may, for example, be a computer, personal digital assistant, laptop, tablet, smart phone, media player, electronic reading device, data communication device, or a wearable device, virtual reality device, or any combination thereof. The mobile device may be a custom mobile device that may be in communication with EGM 10. The mobile device may be operable by a user and may be any portable, networked (wired or wireless) computing device including a processor and memory and suitable for facilitating communication between one or more computing applications of mobile device (e.g. a computing application installed on or running on the mobile device). A mobile device may be a two-way communication device with advanced data communication capabilities having the capability to communicate with other computer systems and devices. The mobile device may include the capability for data communications and may also include the capability for voice communications, in some example embodiments. The mobile device may have at least one data capture camera device to continuously monitor the eye gaze, eye gesture, or movement of the player and collect player eye gaze data, player eye gesture data, or player movement data.

The EGM 10 may include a wireless transceiver that may communicate with the mobile device, for example using standard WiFi or Bluetooth, or other protocol based on the wireless communication capabilities of the mobile device. The player 70 may be able to play the interactive game while the mobile device is in communication with EGM 10. When connected to the EGM 10, the viewing area may be displayed on display device 12, 14 or on the screen of the mobile device, or both. The data capture camera device 25 on the mobile device may collect player eye gaze data, player eye gesture data, or player movement data, which may be processed by a game controller 44 of EGM 10 to determine a location of the eye gaze of the player relative to the viewing area displayed on the mobile device. The game controller 44 may trigger a control command to the display controller 52 to dynamically update the rendering of the viewing area based on the player eye gaze data, player eye gesture data, or player movement data. In response to the control command from the game controller 44, the display controller 52 may control the display device 12, 14, the mobile device, or both, in real-time or near real-time using the graphics processor 54 to dynamically update the rendering of the viewing area to provide a real-time or near real-time graphical animation effect displayed on the display device 12, 14 or the mobile device representative of a visual update to the game components in the viewing area, the visual update based on the player eye gaze data, player eye gesture data, or player movement data.

In some embodiments, the mobile device in communication with EGM 10 may be configured to be a display device that compliments display device 12, 14 when playing the interactive game. The player 70 may interact with the interactive game through the interface of the mobile device, through the EGM 10, or any combination thereof. The interactive game environment, viewing area, and game components of the interactive game may be displayed on the mobile device, display device 12, 14, or any combination thereof.

In some embodiments, a terminal may be connected to one or more EGM 10 over a network. The terminal may serve as a registration terminal for setting up the communication between the mobile device and any EGM 10 connected to the network. Therefore, the player 70 does not have to physically go to EGM 10 to set up the link and play the interactive game associated with EGM 10.

The host system 41 may store account data for players. The EGM 10 may communicate with host system 41 to update such account data, for example, based on wins and losses. In an embodiment, host system 41 stores the aforementioned game data, and EGM 10 may retrieve such game data from host system 41 during operation.

In some embodiments, the electronics on the various boards described herein may be combined onto a single board. Similarly, in some embodiments, the electronics on the various controllers and processors described herein may be integrated. For example, the processor of game controller 44 and graphics processor 54 may be a single integrated chip.

As shown, the EGM 10 may include a card reader 34 to identify a monetary amount conveyed by a player 70 to the electronic gaming machine.

The EGM 10 may include at least one data capture camera device to continuously monitor eye gaze of a player to collect player eye gaze data.

The EGM 10 may include a game controller 44 for determining a location of the eye gaze of the player relative to the viewing area using the player eye gaze data and triggering a control command to the display controller 52 to dynamically update the rendering of the viewing area based on the player eye gaze data.

In response to detection of the control command, the display controller 52 controls the display device 12, 14 in real-time or near real-time using the graphics processor 54 to dynamically update the rendering of the viewing area to provide a real-time or near real-time graphical animation effect displayed on the display device 12, 14 representative of a visual update to the visible game components in the viewing area, the visual update based on the player eye gaze data.

In response to an outcome of the interactive game, the card reader 34 updates the monetary amount.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. The devices provide improved computer solutions for hardware limitations such as display screen, display device, and so on.

The foregoing discussion provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Embodiments described herein may be implemented by using hardware only or by using software and a necessary universal hardware platform. Based on such understandings, the technical solution of embodiments may be in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided by the embodiments.

The embodiments described herein are implemented by physical computer hardware. The embodiments described herein provide useful physical machines and particularly configured computer hardware arrangements. The embodiments described herein are directed to electronic machines methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components. Substituting the computing devices, servers, receivers, transmitters, processors, memory, display, networks particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

For example, and without limitation, the computing device may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A gaming device comprising:
a display device;
an image capture device to capture images of eyes of a plurality of users of the gaming device;
a processor circuit; and
a memory comprising machine-readable instructions that, when executed by the processor circuit, cause the processor circuit to:
generate, for each of the images of eyes of the plurality of users, gaze direction data corresponding to gaze directions of the eyes of each of the plurality of users; and
based on the gaze direction data of the plurality of users, modify a gaming device function,
wherein the plurality of users comprises a first user and a plurality of second users,
wherein the first user comprises a player of the gaming device, and
wherein the plurality of second users comprises a plurality of nonplaying observers that are observing the gaming device being played by the player,
wherein the instructions further cause the processor to determine how many of the plurality of nonplaying observers are gazing at a same location that the player is gazing at, and
wherein the gaming device function is modified to comprise a graphic representing how many of the plurality of nonplaying observers are gazing at the same location as the player.

2. The gaming device of claim 1, wherein the plurality of users comprises a first user and a second user,
wherein the first user comprises a player of the gaming device, and
wherein the second user comprises a nonplaying observer that is observing the gaming device being played by the player.

3. The gaming device of claim 1, wherein the plurality of users comprises a first user, a second user and a plurality of third users,
wherein the first user comprises a first player of the gaming device,
wherein the second user comprises a second player of the gaming device, and
wherein the plurality of third users comprises a plurality of nonplaying observers that are observing the gaming device being played by the first player and the second player.

4. The gaming device of claim 3, wherein the instructions further cause the processor to:
determine how many of the plurality of nonplaying observers are gazing at first display content corresponding to the first player; and
determine how many of the plurality of nonplaying observers are gazing at second display content corresponding to the second player, and
wherein the gaming device function is modified to comprises a graphic representing how many of the plurality of nonplaying observers are gazing at each of the first display content and the second display content.

5. The gaming device of claim 1, wherein the plurality of users comprises a plurality of nonplaying observers that are observing the gaming device without a player,
wherein the gaming device function is modified to comprise a first graphic and a second graphic,
wherein the instructions further cause the processor to:
determine a first quantity of the plurality of nonplaying observers that are gazing at the first graphic; and
determine a second quantity of the plurality of nonplaying observers that are gazing at the second graphic, and
determine user interest by comparing the first quantity and the second quantity.

6. The gaming device of claim 1, wherein the gaming device function is modified to display a graphic to attract ones of the plurality of users to gaze at a given location on the display device,
wherein the instructions further cause the processor to:
compare the gaze direction data received responsive to displaying the graphic to location data corresponding to the graphic to generate a gaze direction error; and
responsive to the gaze direction error, calibrate values used in generating the gaze direction data.

7. The gaming device of claim 1, wherein the plurality of users comprises a first user and a second user,
wherein the first user comprises a first player of the gaming device,
wherein the second user comprises a second player of the gaming device,
wherein the gaze direction data comprises first gaze direction data corresponding to the first player and second gaze direction data corresponding to the second player,
wherein the gaming device function is modified to display a plurality of graphical elements that are each selectable by either the first player or the second player based on the respective first and second gaze direction data.

8. The gaming device of claim 7, wherein ones of the plurality of graphical elements are associated with different point values,
wherein responsive to the first player selecting a first portion of the plurality of graphical elements, the instructions cause the processor to award the first player in an amount corresponding to a sum of point values of the first portion of graphical elements.

9. The gaming device of claim 7, wherein the instructions cause the processor to receive a selection of one of the plurality of graphical elements by the first player based on determining that the first gaze direction data indicates that the first player is gazing at the one of the plurality of graphical elements for a predefined period of time.

10. The gaming device of claim 1,
wherein the plurality of users comprises a first user and a second user,
wherein the first user comprises a first player of the gaming device,
wherein the second user comprises a second player of the gaming device,
wherein the gaze direction data comprises first gaze direction data corresponding to the first player and second gaze direction data corresponding to the second player,
wherein the gaming device function is modified to display a graphical element that moves around the display to attract the first player and the second player to try to continuously gaze at the graphical element, and
wherein the first player is awarded with a higher score than the second player responsive to the first gaze direction being directed to the graphical element more than the second gaze direction over a given period of time.

11. The gaming device of claim 1,
wherein the plurality of users comprises a first user and a second user,
wherein the first user comprises a first player of the gaming device,
wherein the second user comprises a second player of the gaming device,
wherein the gaze direction data comprises first gaze direction data corresponding to the first player and second gaze direction data corresponding to the second player,
wherein the gaming device function is modified to display a graphical element at a different location on the display for a given time interval to attract the first player and the second player to try to gaze at the graphical element before it disappears, and
wherein the first player is awarded with a higher score than the second player responsive to the first gaze direction being directed to the graphical element before the second gaze direction is directed to the graphical element.

12. The gaming device of claim 1,
wherein the plurality of users comprises a first user and a second user,
wherein the first user comprises a first player of the gaming device,
wherein the second user comprises a second player of the gaming device,
wherein the gaze direction data comprises first gaze direction data corresponding to the first player and second gaze direction data corresponding to the second player,
wherein the gaming device function is modified to display a plurality of graphical elements at different relative locations on the display and to sequentially highlight different ones of the plurality of graphical elements for a given time interval to attract the first player and the second player to try to gaze at the respective graphical element before the highlighting changes to another graphical element, and
wherein the first player is awarded with a higher score than the second player responsive to the first gaze direction being directed to the highlighted graphical element before the second gaze direction is directed to the highlighted graphical element.

13. A method comprising:
capturing, by an image capture device, plurality of images of an eye of each of a plurality of players of a gaming device at a plurality of respective times;
generating, for each image of the plurality of images, gaze direction data indicative of a gaze direction of the eye of the plurality of players at the respective times corresponding to the image; and
based on the gaze direction data of the plurality of players, modifying a gaming device function,
wherein the plurality of users comprises a first user and a second user,
wherein the first user comprises a first player of the gaming device,
wherein the second user comprises a second player of the gaming device,
wherein the gaze direction data comprises first gaze direction data corresponding to the first player and second gaze direction data corresponding to the second player,
wherein the gaming device function is modified to display a plurality of graphical elements at different relative locations on the display to attract the first player and the second player to gaze at the respective graphical elements, and
wherein the first player and the second player are awarded a score based on an amount of time that the first and second gaze direction data indicate that the first gaze direction and the second gaze direction are both directed to the graphical element.

14. The method of claim 13,
wherein the gaming device function comprises a plurality of defined locations on a display of the gaming device that each correspond to possible answers of a question provided to the plurality of players,
wherein one of the defined locations corresponds to a correct answer to the question,
wherein ones of the plurality of players that comprise gaze direction data that corresponds to the defined location that corresponds to the correct answer are awarded a higher score than the other ones of the plurality of players.

15. The method of claim 13,
wherein the gaming device function comprises a plurality of graphical elements on a display of the gaming device,
wherein the method further comprises modifying a display characteristic based on which of the plurality of graphical elements the plurality of players focus their gaze based on the gaze direction data.

* * * * *